(12) United States Patent
Tornow et al.

(10) Patent No.: US 10,962,044 B2
(45) Date of Patent: Mar. 30, 2021

(54) MULTIPLE PIECE HIGH SECURITY FASTENER

(71) Applicant: McGard LLC, Orchard Park, NY (US)

(72) Inventors: Daniel R. Tornow, Boston, NY (US); Weston J. Ulrich, West Falls, NY (US); Timothy J. Fox, Alden, NY (US); David C. Meyer, Boston, NY (US)

(73) Assignee: McGard LLC, Orchard Park, NY (US)

( * ) Notice: Subject to any disclaimer, the term of this patent is extended or adjusted under 35 U.S.C. 154(b) by 183 days.

(21) Appl. No.: 16/160,365

(22) Filed: Oct. 15, 2018

(65) Prior Publication Data

US 2019/0113068 A1 Apr. 18, 2019

Related U.S. Application Data

(60) Provisional application No. 62/572,616, filed on Oct. 16, 2017.

(51) Int. Cl.
| | |
|---|---|
| *A47G 3/00* | (2006.01) |
| *F16B 37/14* | (2006.01) |
| *F16B 39/02* | (2006.01) |
| *F16B 39/12* | (2006.01) |
| *F16B 41/00* | (2006.01) |

(52) U.S. Cl.
CPC ............ *F16B 37/14* (2013.01); *F16B 39/025* (2013.01); *F16B 39/12* (2013.01); *F16B 41/005* (2013.01)

(58) Field of Classification Search
CPC ............................... F16B 37/14; F16B 41/005
USPC .................................. 411/373; 70/231, 232
See application file for complete search history.

(56) References Cited

U.S. PATENT DOCUMENTS

| | | | | |
|---|---|---|---|---|
| 2,179,045 A | * | 11/1939 | Lewis .................... | F16L 55/10 220/284 |
| 4,856,305 A | * | 8/1989 | Adams ................ | E05B 73/0005 70/58 |
| 4,968,202 A | * | 11/1990 | Lanham .................... | B60B 7/00 411/377 |

(Continued)

FOREIGN PATENT DOCUMENTS

| | | |
|---|---|---|
| DE | 202016104567 U1 | 12/2017 |
| EP | 3006747 B1 | 12/2018 |
| WO | 2004001327 A1 | 6/2003 |

OTHER PUBLICATIONS

European Patent Office, International Search Report and Written Opinion of the ISA/EP from corresponding PCT Application No. PCT/US2018/055874, dated Jan. 31, 2019.

*Primary Examiner* — Gary W Estremsky
(74) *Attorney, Agent, or Firm* — Harter Secrest & Emery LLP

(57) ABSTRACT

An improved fastener comprising a fastener body having a tool-engaging portion, a threaded fastening portion and a shroud-receiving body portion, a shroud concentrically mounted on the shroud-receiving body portion, and an intermediate sleeve disposed concentrically between the shroud-receiving body portion and the shroud, the shroud being supported in rotatable relationship with said shroud-receiving body portion such that said shroud will rotate relative to said fastener body under an applied external torque prior to said fastener body rotating when said fastener is engaged with an external structure at a design installation torque.

27 Claims, 6 Drawing Sheets

(56) References Cited

U.S. PATENT DOCUMENTS

| | | | | |
|---|---|---|---|---|
| 5,807,048 A * | 9/1998 | d'Agraives | ............ | F16B 41/005 |
| | | | | 411/14 |
| 5,906,463 A * | 5/1999 | Damm | ................. | F16B 43/001 |
| | | | | 411/369 |
| 5,971,848 A * | 10/1999 | Nair | ......................... | F24F 7/02 |
| | | | | 454/365 |
| 6,305,890 B1 * | 10/2001 | Okamura | .................. | B60B 7/16 |
| | | | | 411/372.5 |
| 6,435,791 B1 * | 8/2002 | Bydalek | .................. | B60B 3/145 |
| | | | | 411/371.2 |
| 7,445,414 B1 * | 11/2008 | Notaro | .................. | F16B 41/005 |
| | | | | 411/432 |
| 8,016,535 B1 * | 9/2011 | Roberts | ................. | F16B 41/005 |
| | | | | 411/429 |
| 8,366,367 B2 * | 2/2013 | Matlock | .................. | F16B 37/14 |
| | | | | 411/429 |
| 8,888,430 B2 * | 11/2014 | Groppo | ................. | F16B 41/005 |
| | | | | 411/403 |
| 9,016,096 B2 * | 4/2015 | Winnie | .................. | F16B 39/12 |
| | | | | 70/232 |

* cited by examiner

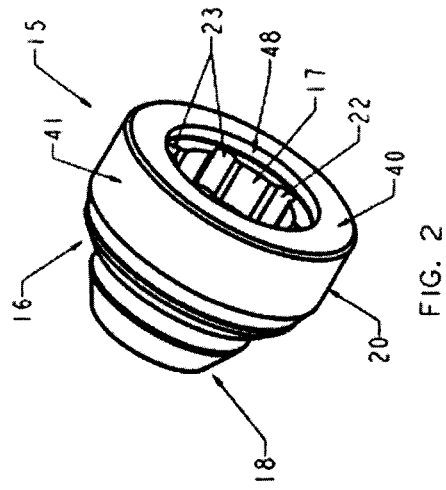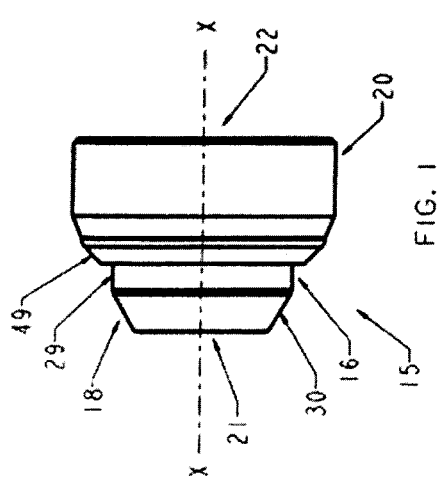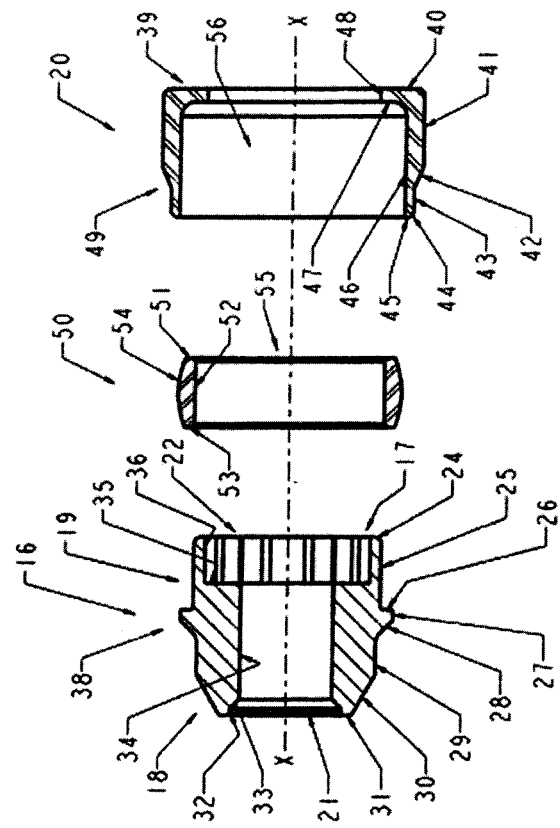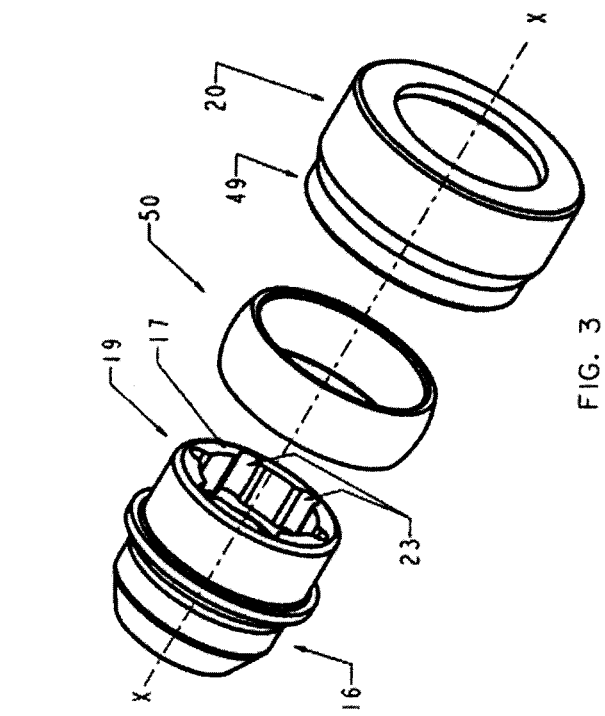

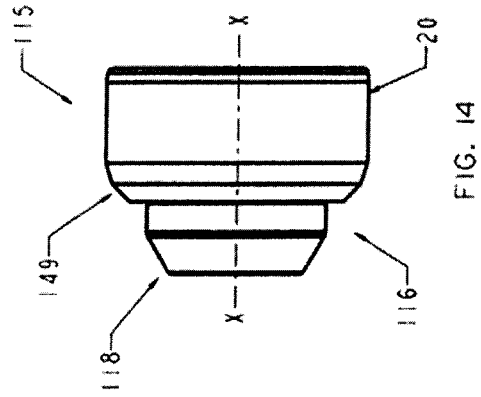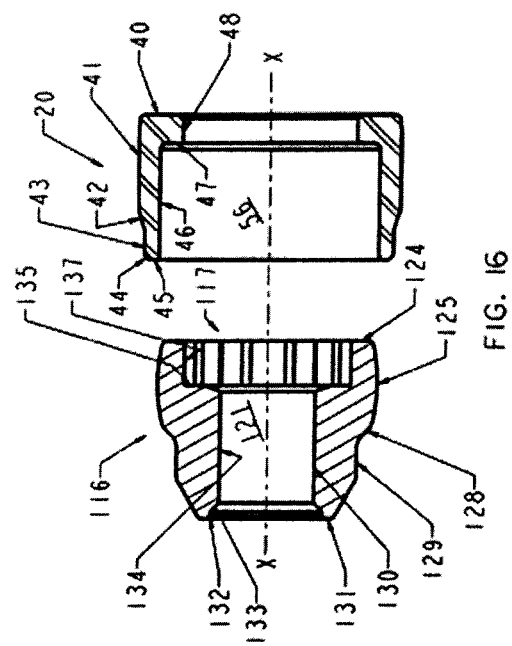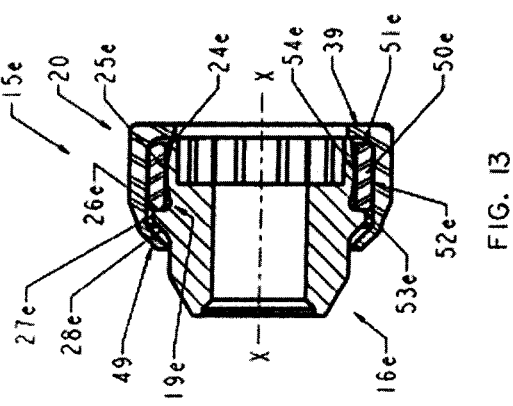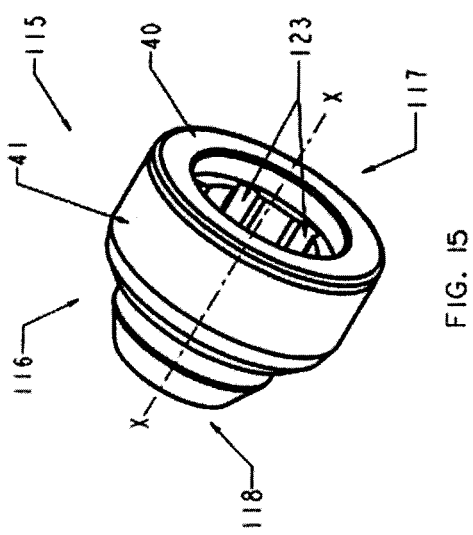
FIG. 13
FIG. 14
FIG. 15
FIG. 16

US 10,962,044 B2

MULTIPLE PIECE HIGH SECURITY FASTENER

TECHNICAL FIELD

The present invention relates to high security fasteners, and more particularly to a high security fastener having multiple piece or limited contact cap or shroud.

BACKGROUND ART

Locking wheel nuts and wheel bolts are commonly used to attach wheels to axel hub assemblies of automobiles and other vehicles. These fasteners are designed with security features that are intended to thwart theft by rendering the fasteners difficult to remove with conventional tools. In particular, the fasteners do not have the usual hexagonal head pattern found on conventional nuts and bolts and instead have smooth cylindrical sidewalls that cannot be gripped by standard wrenches. Fastener removal requires the use of a special security tool having a unique key pattern that matches a corresponding groove pattern formed in the fastener end face.

Additional security can be obtained by fitting a free-spinning shroud or cap over the security fasteners cylindrical sidewalls, such that the shroud is in concentric relationship therewith. The shroud discourages the use of theft devices that could otherwise be used to grip the sidewalls and remove the fastener without an authorized security tool. Because the shroud substantially surrounds all exposed surfaces of the sidewalls, no rotational purchase can be obtained in the fastener. The theft device can only engage the shroud, which freely spins under action of the theft device while the main body of the fastener remains stationary.

Various systems have been developed for rotationally retaining the shroud or spin cap on the fastener body. For example, U.S. Pat. No. 7,445,414, entitled "High Security Fastener Constructions," is directed to a shroud fastener design having a shroud retaining system for retaining the shroud for rotation relative to the fastener body. The entire contents and disclosure of U.S. Pat. No. 7,445,414 are incorporated herein by reference. International Patent Publication No. WO2004/001237, entitled "Screw-Threaded Fastening," is directed to a wheel nut having a fastener body and a spin cap or shroud which is retained on the fastener body by means of an outwardly flared end portion of the fastener body which is received within an undercut triangular groove in the inner surface of the cap.

BRIEF SUMMARY

With parenthetical reference to corresponding parts, portions or surfaces of the disclosed embodiment, merely for the purposes of illustration and not by way of limitation, an improved fastener (15, 15a, 15b, 15c, 15d, 15e) is provided comprising: a fastener body (16, 16e) orientated about a central axis (x-x); the fastener body having a tool-engaging portion (17) to which a driving torque may be applied and a threaded fastening portion (18) configured and arranged to mate with a corresponding threaded element; the fastener body having a shroud-receiving body portion (19, 19e) orientated about the central axis; a shroud (20, 20d) concentrically mounted on the shroud-receiving body portion; an intermediate sleeve (50, 50a, 50b, 50c, 50d, 50e) disposed concentrically between the shroud-receiving body portion and the shroud; the shroud having an inner surface (46, 46d) facing an outer surface (54, 54a, 54b, 54c, 54d, 54e) of the intermediate sleeve; the intermediate sleeve having an inner surface (52, 52a, 52b, 52c, 52d, 52e) facing an outer surface (25, 25e) of the shroud-receiving body portion; the shroud being supported in rotatable relationship with the shroud-receiving body portion such that the shroud will rotate relative to the fastener body under an applied external torque prior to the fastener body rotating when the fastener is engaged with an external structure at a design installation torque; a first shroud-retaining element (49) restraining the shroud from movement in at least a first axial direction along the central axis relative to the fastener body; and a second shroud-retaining element (39) restraining the shroud from movement in at least a second axial direction along the central axis opposite to the first axial direction along the central axis relative to the fastener body.

The outer surface of the intermediate sleeve may have a coefficient of friction less than the outer surface of the shroud-receiving body portion. The inner surface of the intermediate sleeve may have a coefficient of friction less than the outer surface of the shroud-receiving body portion. The outer surface of the intermediate sleeve may have coefficient of friction less than the inner surface of the shroud. The intermediate sleeve may comprise a lubricant-releasing medium or a polymer. The intermediate sleeve may comprise a material selected from a group consisting of a lubricant-impregnated nylon plastic, a lubricant-filled nylon plastic, a polytetrafluoroethylene (PTFE) releasing polymer, a graphite impregnated porous bronze or iron alloy, and a lubricant-impregnated porous bronze or iron alloy.

The intermediate sleeve may be supported in rotatable relationship with the shroud-receiving body portion and the shroud such that the intermediate sleeve is rotatable about the central axis relative to both the fastener body and the shroud. The fastener body may comprise a lock nut or a lock bolt.

The fastener may comprise a first sleeve-retaining element (38) restraining the intermediate sleeve from movement in at least a first axial direction along the central axis relative to the fastener body and a second sleeve-retaining element (39) restraining the intermediate sleeve from movement in at least a second axial direction along the central axis opposite to the first axial direction along the central axis relative to the fastener body. The first shroud-retaining element may comprise a surface (28, 28e) of the fastener body and the second shroud-retaining element may comprise a surface (24, 24e) of the fastener body. The first sleeve-retaining element may comprise a surface (26, 26e) of the fastener body and the second sleeve-retaining element may comprise a surface (47, 47d) of the shroud. The first sleeve-retaining element may comprise an annular shoulder (38) of the fastener body facing an opposed annular end (53, 53a, 53b, 53c, 53d, 53e) of the intermediate sleeve. The second sleeve-retaining element may comprise an annular flange (39) of the shroud facing an opposed annular end of the intermediate sleeve (51, 51a, 51b, 51c, 51d, 51e). The first shroud-retaining element may comprise an annular end portion (49, 49d) of the shroud bent inwardly transverse to the central axis and facing an opposed annular step (28, 28d) of the fastener body. The second shroud-retaining element may comprise the annular flange (39) of the shroud facing an opposed annular end (24, 24e) of the fastener body.

A coefficient of friction between the outer surface of the intermediate sleeve and the inner surface of the shroud may be less than a coefficient of friction between the outer surface of the shroud-receiving body portion and the inner surface of the shroud. The coefficient of friction between the outer surface of the intermediate sleeve and the inner surface of the shroud may be less than about 0.2. The coefficient of friction between the outer surface of the intermediate sleeve and the inner surface of the shroud may be less than about 0.05.

The inner surface (46, 46d) of the shroud may be not substantially parallel to the outer surface (54, 54c, 54d) of the intermediate sleeve and the inner surface of the intermediate sleeve (52, 52a, 52b, 52d) may be substantially parallel to the outer surface (25) of the shroud-receiving body portion. The inner surface (46) of the shroud may be a substantially cylindrical surface along the axially overlapping portion and the outer surface (54, 54c) of the intermediate sleeve may be a substantially convex curved surface along the axially overlapping portion. The outer surface of the shroud-receiving body portion (25) may be a substantially cylindrical surface along the axially overlapping portion and the inner surface (52b, 52c) of the intermediate sleeve may be a substantially convex curved surface along the axially overlapping portion. The outer surface (54a, 54b, 54d, 54e) of the intermediate sleeve may be a substantially cylindrical surface along the axially overlapping portion and the inner surface (46d) of the shroud may be a substantially convex curved surface along the axially overlapping portion. The inner surface (52, 52a, 52d, 52e) of the intermediate sleeve may be a substantially cylindrical surface along the axially overlapping portion and the outer surface (25e) of the shroud-receiving body portion may be a substantially convex curved surface along the axially overlapping portion.

In another aspect, a fastener (115, 115a) is provided comprising: a fastener body (116, 116a) orientated about a central axis (x-x); the fastener body having a tool-engaging portion (117) to which a driving torque may be applied and a threaded fastening portion (118) configured and arranged to mate with a corresponding threaded element; the fastener body having a shroud-receiving body portion (119, 119a) orientated about the central axis; a shroud (20) concentrically mounted on the shroud-receiving body portion; a first shroud-retaining element (149) at a first axial position along the central axis restraining the shroud from movement in at least a first axial direction along the central axis relative to the fastener body; a second shroud-retaining element (39) at a second axial position along the central axis restraining the shroud from movement in at least a second axial direction along the central axis opposite to the first axial direction along the central axis relative to the fastener body; the shroud having a shroud inner surface (46) orientated about the central axis facing a body outer surface (125, 225) orientated about the central axis of the shroud-receiving body portion along an axially overlapping portion (67) of the shroud and the fastener body between the first axial position and the second axial position; the shroud being supported relative to the shroud-receiving body portion so as to define an annular varying radial gap (160) between the shroud inner surface and the body outer surface along the axially overlapping portion; and the shroud being supported in rotatable relationship with the shroud-receiving body portion such that the shroud will rotate relative to the fastener body under an applied external torque prior to the fastener body rotating when the fastener is engaged with an external structure at a design installation torque.

The shroud inner surface may be not substantially parallel to the body outer surface along the axially overlapping portion. The shroud inner surface (46) may comprise a substantially cylindrical surface along the axially overlapping portion and the body outer surface (125, 125a-f) may comprise a convex curved surface along the axially overlapping portion. The shroud may be supported in rotatable relationship with the shroud-receiving body portion at no more than three discrete annular contact regions (70, 70a, 71, 71a, 72, 72a). The annular contact regions may comprise a first annular contact region (70, 70a) defined by the first shroud retaining element, a second annular contact region (72, 72a) defined by the second shroud retaining element, and an intermediate annular contact region (71, 71a) positioned axially between the first annular contact region and the second annular contact region.

The first shroud-retaining element may comprise an annular end portion (49) of the shroud bent inwardly transverse to the central axis and facing an opposed annular step (128, 128a) of the fastener body. The second shroud-retaining element may comprise an annular flange (39) of the shroud facing an opposed annular end (124, 124a) of the fastener body. The intermediate annular region (71, 71a) may be between the first annular contact region and the second annular contact region at an axial position at which the annular varying radial gap is a minimum (161).

The shroud inner surface (46) may comprise a substantially cylindrical surface along the axially overlapping portion and the body outer surface (225) may comprise a convex curved surface (125a-f) along the axially overlapping portion having multiple grooves (90a-90f) extending longitudinally therein. The annular varying radial gap may have a cross-sectional area in a plane generally perpendicular to the central axis and the cross-section area may be not uniform along the axially overlapping portion. The cross-section area may vary from a minimum cross-sectional area at a first axial position (161) along the axially overlapping portion to a maximum cross-sectional area (162) at a second axial position along the axially overlapping portion.

BRIEF DESCRIPTION OF THE DRAWINGS

FIG. 1 is a side elevation view of a first embodiment of an improved security fastener.

FIG. 2 is a right perspective view of the security fastener shown in FIG. 1.

FIG. 3 is a pre-assembled exploded perspective view of the security fastener shown in FIG. 1.

FIG. 4 is a pre-assembled exploded longitudinal vertical sectional view of the security fastener shown in FIG. 1.

FIG. 13 is a fully-assembled longitudinal vertical sectional view of a sixth embodiment of the security fastener shown in FIG. 1.

FIG. 14 is a side elevation view of a seventh embodiment of an improved security fastener.

FIG. 15 is a perspective view of the security fastener shown in FIG. 14.

FIG. 16 is a pre-assembled exploded longitudinal vertical sectional view of the security fastener shown in FIG. 14.

DETAILED DESCRIPTION OF THE EMBODIMENTS

Figure 6:
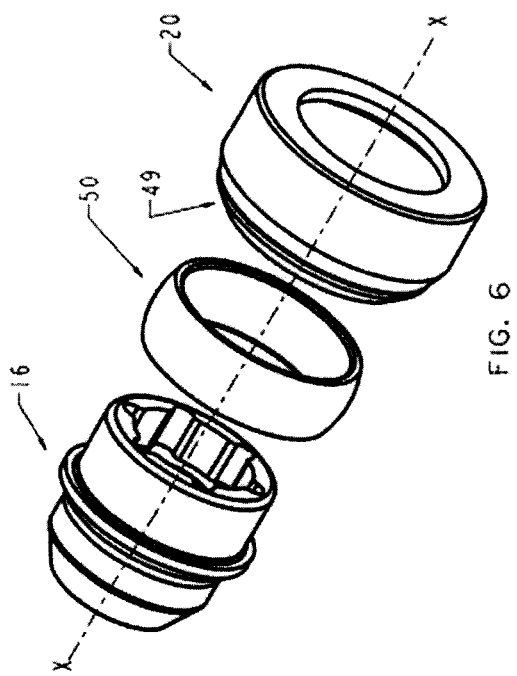
FIG. 6 is a fully-assembled exploded perspective view of the security fastener shown in FIG. 1.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to FIGS. 1-8, an improved multiple piece safety fastener is provided, a first embodiment of which is generally indicated at 15. Fastener 15 generally includes fastener body 16, cap or shroud 20, which rotates about axis x-x relative to fastener body 16, and intermediate sleeve 50, which is rotatable about axis x-x relative to both fastener body 16 and shroud 20. Fastener body 16 includes threaded fastening portion 18, inner tool engaging portion 17, and outer shroud-retaining portion 19, on which sleeve 50 and shroud 20 are each rotationally and concentrically supported.

With reference to FIG. 4, fastener body 16 is a specially configured cylindrical member elongated along axis x-x and is generally bounded by rightwardly-facing vertical annular surface 24, outwardly-facing horizontal cylindrical surface 25, rightwardly-facing annular vertical surface 26, outwardly-facing horizontal cylindrical surface 27, leftwardly and outwardly-facing frusto-conical surface 28, outwardly-facing horizontal cylindrical surface 29, leftwardly and outwardly-facing frusto-conical surface 30, leftwardly-facing vertical annular surface 31, inwardly-facing horizontal cylindrical surface 32, leftwardly and inwardly-facing frusto-conical surface 33, inwardly-facing horizontal cylindrical surface 34, rightwardly-facing vertical annular surface 35, and inwardly-facing horizontal key patterned cylindrical surface 36.

Surfaces 31, 32, 33 and 34 generally define threaded fastening portion 18. Threaded fastening portion 18 of fastener body 16 includes cylindrical bore 21, defined by surface 34, that extends inwardly from the left face 31 of body 16 and is internally threaded over a portion or all of its length. Nut fastener 15 may be installed in a wheel having a recess hole formed as a relatively deep cylindrical well. The wheel hole has an annular recess entrance and a wheel stud or post in the wheel hole, and fastener body 16 and fastening portion 18 are sized and installed such that the interior threads of inner bore 21 engage the corresponding exterior threads of the wheel stud in the wheel hole.

Surfaces 24, 36 and 35 generally define tool engaging portion 17. Tool engaging portion 17 of fastener body 16 includes specially configured inner cavity or socket 22, defined by lock patterned surface 36, that extends inwardly from right end face 24 of body 16 and has a specially configured internal profile to which a drive torque may be applied. This internal profile comprises a key-receiving pattern that may be implemented as a set of circumferentially spaced internally facing longitudinally extending key-receiving grooves 23 arranged in a lock pattern to which a drive torque may be applied, with the entrance to socket 22 formed with the key lock pattern. As can be seen, lock pattern grooves 23 are visible on the annular right front face 24 of tool engaging portion 17. In order to impart lock pattern uniqueness, lock pattern grooves 23 may be patterned or configured in any suitable alternative manner, such as by employing a selected number of grooves and/or by varying other features thereof, such as the spacing between grooves and/or the width, length, depth, profile or other configuration or feature thereof. Such grooves are configured so that a corresponding drive key tool (no shown) may be used to engage lock pattern grooves 23. The key includes a drive shaft formed with a key pattern that may be implemented as a set of circumferentially arranged key pattern lobes that are configured and arranged to engage lock pattern grooves 23 in socket 22 when the drive shaft is properly aligned and placed in bore 22 of nut fastener 15. Thus, a key having a matching set of key pattern lobes may be used to engage lock pattern grooves 23 to actuate nut fastener 15 about axis x-x.

The security key is configured to fit within bore 22 to engage the lock pattern and rotate nut fastener 15. Other tools either will not fit within bore 22 or will not be able to properly engage and rotate nut fastener 15 when it is installed at its intended design installation torque. The ability of shroud 20 to spin relative to sleeve 50 and fastener body 16 thereof provides a security feature that protects fastener 15 from being used as a purchase point for unauthorized tools. Should an attempt be made to rotate fastener 15 by gripping the exposed end, cap 20 will tend to spin without any rotation being imparted to fastener body 16 and fastening portion 18 thereof.

Shroud-retaining portion 19, on which sleeve 50 and shroud 20 are each rotationally and concentrically supported, is at the same end of body 16 as tool engaging portion 17. Surfaces 24, 25, 26, 27 and 28 generally define shroud-retaining portion 19. As shown, retaining portion 19 of fastener body 16 comprises cylindrical surface 25 orientated about axis x-x and axially bounded at one end by shoulder 38, defined by annular surface 26, and axially bounded at the other end by a step defined by annular end surface 24. Cylindrical surface 25 has outer diameter 61.

Sleeve 50 extends over and around shroud receiving portion 19 and is separately formed from shroud 20 and fastener body 16. With reference to FIG. 4, sleeve 50 is a specially configured cylindrical member elongated along axis x-x and is generally bounded by rightwardly-facing vertical annular surface 51, inwardly-facing horizontal cylindrical surface 52, leftwardly-facing vertical annular surface 53, and outwardly-facing convex surface 54. As shown, sleeve 50 includes inner bore 55, defined by surface 52, having uniform inside diameter 62 that is approximately the same size as outside diameter 61 of retaining portion 19. As shown, outer surface 54 has a convex longitudinal profile or barrel shape relative to axis x-x, curving from minimum outside diameter 65 at left annular face 53 and right annular face 51, respectively, to maximum outside diameter 63 at the axial midpoint between left annular face 53 and right annular face 51. However, sleeve 50 may have other outside surface profiles.

Shroud 20 extends over and around sleeve 50 and retaining portion 19 of fastener body 16. In the pre-assembled state shown in FIG. 4, shroud 20 is a specially configured cylindrical member elongated along axis x-x and is generally bounded by rightwardly-facing vertical annular surface 40, outwardly-facing horizontal cylindrical surface 41, leftwardly and outwardly-facing frusto-conical surface 42, outwardly-facing horizontal cylindrical surface 43, leftwardly and outwardly-facing frusto-conical surface 44, leftwardly-facing vertical annular surface 45, inwardly-facing horizontal cylindrical surface 46, leftwardly-facing vertical annular surface 47, and inwardly-facing horizontal cylindrical surface 48. As shown, shroud 20 includes inner bore 56, defined by surface 47, having uniform inside diameter 64 just slightly larger than the maximum outside diameter 63 of convex surface 54 of sleeve 50.

Figure 5:
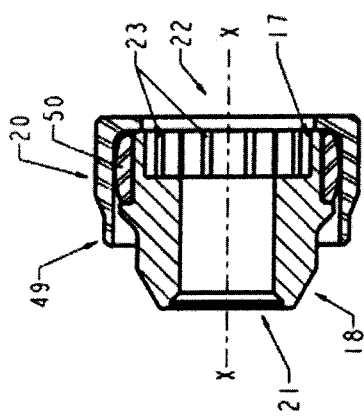
FIG. 5 is a pre-assembled longitudinal vertical sectional view of the security fastener shown in FIG. 1.

In the pre-assembled state shown in FIG. 5, sleeve 50 has been placed over left distal end 24 of body 16 such that leftwardly-facing annular end face 53 of sleeve 50 abuts against rightwardly-facing annular shoulder surface 26 of retaining portion 19. As shown, in this pre-assembled state, sleeve 50 has an axial width such that rightwardly-facing annular end face 51 of sleeve 50 is axially to the left of or aligned with rightwardly-facing annular end face 24 of retaining portion 19 of fastener body 16.

In this pre-assembled state, shroud 20 has in turn been placed over left distal end 24 of body 16 such that the inner annular portion of leftwardly-facing annular surface 47 of flange 39 of shroud 20 abuts against rightwardly-facing annular end face 24 of retaining portion 19 of fastener body 16. As shown, in this pre-assembled state the left thin-walled tubular end 49 of shroud 20 is dimensioned to extend leftwardly a distance beyond shoulder 38 of fastener body 16, defined by surfaces 26, 27 and 28. When assembled as described below, this extension will be reduced in axial length along axis x-x as end portion 49 of shroud 20 deforms and bends or curls inwardly against the sloped left surface 28 of shoulder 38 of retaining portion 19 of fastener body 16.

Figure 8:
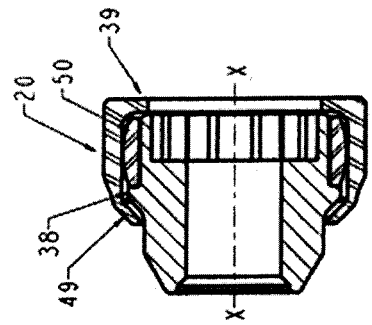
FIG. 8 is a fully-assembled longitudinal vertical sectional view of the security fastener shown in FIG. 1.
Figure 7:
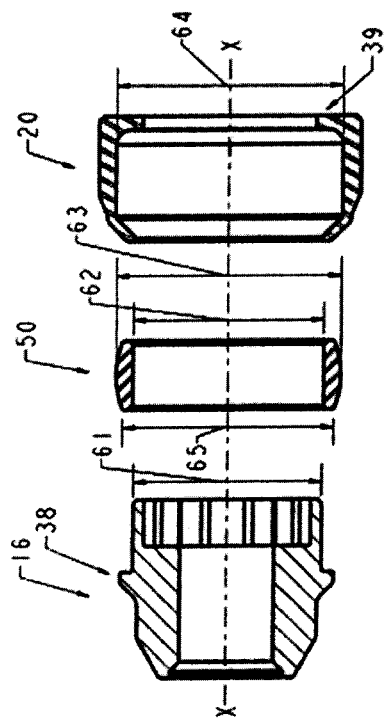
FIG. 7 is a fully-assembled exploded longitudinal vertical sectional view of the security fastener shown in FIG. 1

To complete assembly of fastener 15, with sleeve 50 and shroud 20 placed on fastener body 16 as described above, a rightward and inward axial and radial force is then applied with a ram to surface 44 of end 49 of shroud 20 while right inwardly-extending annular flange 39, defined by surfaces 47, 48 and 40, of shroud 20, and end face 24 of fastener body 16, are held stationary in a press or the like. Such force is great enough to bend and deform annular end rim portion 49 of shroud 20 inward against opposed surfaces 28 and 29 of fastener body 16, as shown in FIGS. 7 and 8, which depict the fully assembled configuration of fastener 15. Thus, fastener body 16 and shroud 20 are specially formed such that applying a directed force to rim 49 of shroud 20 causes annular end rim portion 49 of shroud 20 to flare or deform inwards around specially formed shoulder 38 of retaining portion 19 of fastener body 16.

When assembled, at least deformed portion 49 of shroud 20, which is bent inwardly transverse to central axis x-x, radially overlaps shoulder 38 of retaining portion 19 of fastener body 16, thereby retaining shroud 20 from moving axially to the right relative to fastener body 16 such that shroud 20 is free to rotate about center axis x-x of body 16 but is restrained from moving axially to the right off of retaining portion 19 and body 16. In the other direction, surface 24 of retaining portion 19 of body 16 and opposed surface 47 of inwardly extending flange 39 of shroud 20 retain shroud 20 such that shroud 20 is free to rotate about center axis x-x of body 16 but is restrained from moving axially to the left.

Regarding sleeve 50, when assembled as shown in FIG. 8, surface 26 of shoulder 38 of retaining portion 19 of fastener body 16 radially overlaps end face 53 of sleeve 50, thereby retaining sleeve 50 from moving axially to the left relative to fastener body 16 such that sleeve 50 is free to rotate about center axis x-x of body 16 but is restrained from moving axially to the left off of retaining portion 19 and body 16. Since bent portion 49 of shroud 20 radially overlaps shoulder 33 of retaining portion 19 of fastener body 16, thereby retaining shroud 20 from moving axially to the right relative to fastener body 16, annular surface 47 of flange 39 of shroud 20 and opposed surface 51 of sleeve 50 retain sleeve 50 such that sleeve 50 is free to rotate about center axis x-x of body 16 but is restrained from moving axially to the right.

Sleeve 50 and shroud 20 are thereby both mounted concentrically on retaining portion 19 of fastener 15 such that neither moves axially off of surface 25 of retaining portion 19 but both are substantially free to rotate about axis x-x relative to fastener body 16.

In this embodiment, fastener body 16 is a unitary formed piece of steel or stainless steel and shroud 20 is a unitary formed piece of steel or stainless steel. In this embodiment, sleeve 50 is a unitary formed piece of material having bearing surfaces 52 and 55 with a coefficient of friction, both static and kinetic, less than the coefficient of friction of either surface 25 of fastener body 16 or surface 46 of shroud 20. For example, sleeve 50 may be formed of a plastic or polymer material that significantly reduces the coefficient of friction when sleeve 50 rotates relative to fastener body 16 or shroud 20. If fastener body 16 and shroud 20 are both steel, their direct contact would result in a coefficient of friction of about 0.4 to 0.6 (measured in this embodiment by ASTM G115 standard). With plastic intermediate sleeve 50 between fastener body 16 and shroud 20, the coefficient of friction of shroud 20 relative to body 16 is reduced to about 0.1 to 0.3. Sleeve 50 may be formed from other materials that provide increased lubricity or the capacity to reduce friction compared to the material of fastener body 16 and shroud 20. At least surface 54 of sleeve 50 is lubricious and has a smooth or slippery quality. This may also apply to the inner cylindrical surface 52 of sleeve 50. Accordingly, sleeve 50 reduces the friction between fastener body 16 and shroud 20, and limits the cohesive wear or galling between fastener body 16 and shroud 20 by providing a mechanical barrier that reduces abrasion and friction.

Other plastic or polymeric materials may be used as alternatives for sleeve 50, or sleeve 50 may be formed of a lubricant-releasing medium such as an impregnated metal. For example, and without limitation, sleeve 50 may be formed of lubricant-impregnated plastic or polymers, lubricant-filled plastic or polymers, polytetrafluoroethylene (PTFE) releasing plastics or polymers, graphite-impregnated alloys, and or lubricant-impregnated porous alloys such as bronze or iron. When formed of a dry polymer, sleeve 50 may reduce to coefficient of friction between shroud 20 and fastener body 16 to between 0.05 and 0.15. Certain lubricant-impregnated alloys, such as oil-impregnated bronze, may further reduce the coefficient of friction between shroud 20 and fastener body 16 to between 0.04 and 0.07. Sleeve 50 thereby reduces the friction and wear between shroud 20 and fastener body 16. Thus, for example, and without limitation, sleeve 50 may comprise a lubricant-impregnated nylon plastic, a lubricant-filled nylon plastic, a PTFE releasing polymer, a graphite-impregnated porous bronze or iron alloy, or a lubricant-impregnated porous bronze or iron alloy.

If desired, shroud 20 may comprise a cap have a decorative finish to improve fastener appearance, including, but not limited to, nickel/chrome plating, silver or gray coatings. Furthermore, and without limitation, shroud 20 may be a decorative cap that is made of a material that is different than the material of retaining portion 19. Without limitation, such cap may be plastic, rubber or ceramic or may have a coating that is plastic, rubber, ceramic, anodized or organic.

While applying a single axial force with a ram to exposed end rim portion 49 of retaining portion 19 while fastener body 16 and shroud 20 are held stationary in a press has been described, more than a single ramming force may be applied or such force may be applied at various angles relative to axis x-x.

While inwardly extending flange 39 of shroud 20 is shown as preformed, flange 39 may be formed during assembly by bending or crimping an end rim of shroud 20 inwardly with a leftward and inward axial and radial force in a similar manner as described with respect to retaining element 49.

Figure 9:
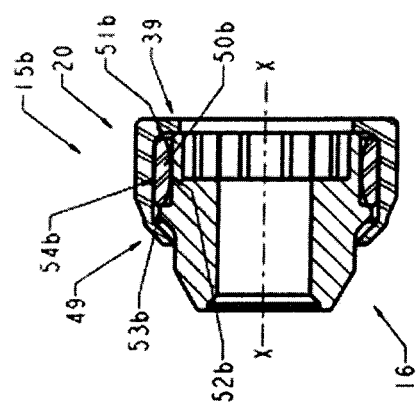
FIG. 9 is a fully-assembled longitudinal vertical sectional view of a second embodiment of the security fastener shown in FIG. 1.

Turning now to FIG. 9, a security fastener 15a according to a second example embodiment is shown. Fastener 15a has many of the features of fastener 15 described above in connection with FIGS. 1-8. The significant difference between fastener 15a and fastener 15 lies in the fact that sleeve 50a of fastener 15a has an outer cylindrical surface 54a rather than an outer convex surface. As shown, in this embodiment sleeve 50a is a specially configured cylindrical member elongated along axis x-x and is generally bounded by rightwardly-facing vertical annular surface 51a, inwardly-facing horizontal cylindrical surface 52a, leftwardly-facing vertical annular surface 53a, and outwardly-facing horizontal cylindrical surface 54a. As shown, in this embodiment outer surface 54a has a cylindrical profile or shape relative to axis x-x with a uniform outside diameter along its entire axial length.

Figure 10:
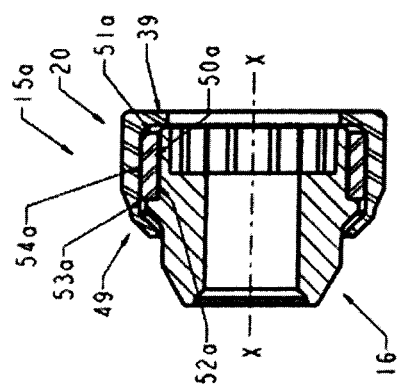
FIG. 10 is a fully-assembled longitudinal vertical sectional view of a third embodiment of the security fastener shown in FIG. 1.

Turning now to FIG. 10, a security fastener 15b according to a third example embodiment is shown. Fastener 15b has many of the features of fastener 15 described above in connection with FIGS. 1-8. The significant difference between fastener 15b and fastener 15 lies in the fact that sleeve 50b of fastener 15b has an outer cylindrical surface 54b rather than an outer convex surface and an inner curved surface 52b rather than an inner cylindrical surface. As shown, in this embodiment sleeve 50b is a specially configured cylindrical member elongated along axis x-x and is generally bounded by rightwardly-facing vertical annular surface 51b, inwardly-facing convex surface 52b, leftwardly-facing vertical annular surface 53b, and outwardly-facing horizontal cylindrical surface 54b. As shown, inner surface 52b has a convex longitudinal profile or shape, curving from a maximum inside diameter relative to axis x-x at left annular face 53b and right annular face 51b, respectively, to a minimum inside diameter relative to axis x-x at the axial midpoint between left annular face 53b and right annular face 51b.

Figure 11:
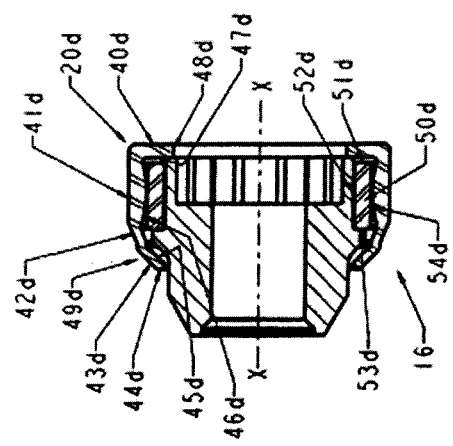
FIG. 11 is a fully-assembled longitudinal vertical sectional view of a fourth embodiment of the security fastener shown in FIG. 1.

Turning now to FIG. 11, a security fastener 15c according to a third example embodiment is shown. Fastener 15c has many of the features of fastener 15 described above in connection with FIGS. 1-8. The significant difference between fastener 15c and fastener 15 lies in the fact that sleeve 50c of fastener 15c has both outer and inner curved surfaces 54c and 52c rather than an outer convex surface and an inner cylindrical surface. As shown, in this embodiment sleeve 50c is a specially configured cylindrical member elongated along axis x-x and is generally bounded by rightwardly-facing vertical annular surface 51c, inwardly-facing convex surface 52c, leftwardly-facing vertical annular surface 53c, and outwardly-facing convex surface 54c. As shown, outer surface 54c has a convex longitudinal profile or shape relative to axis x-x, curving from a minimum outside diameter relative to axis x-x at left annular face 53c and right annular face 51c, respectively, to a maximum outside diameter at the axial midpoint between left annular face 53c and right annular face 51c. As shown, inner surface 52c has a convex longitudinal profile or shape, curving from a maximum inside diameter relative to axis x-x at left annular face 53c and right annular face 51c, respectively, to a minimum inside diameter relative to axis x-x at the axial midpoint between left annular face 53c and right annular face 51c.

Figure 12:
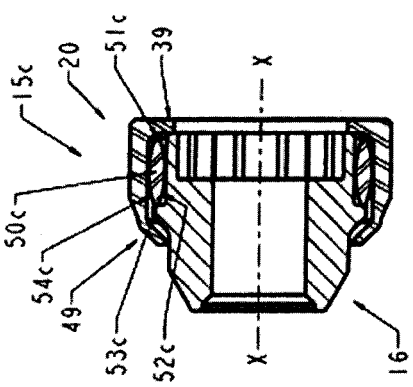
FIG. 12 is a fully-assembled longitudinal vertical sectional view of a fifth embodiment of the security fastener shown in FIG. 1.

Turning now to FIG. 12, a security fastener 15d according to a fourth example embodiment is shown. Fastener 15d has many of the features of fastener 15 described above in connection with FIGS. 1-8. The significant difference between fastener 15d and fastener 15 lies in the fact that sleeve 50d of fastener 15d has an outer cylindrical surface 54d rather than an outer convex surface and shroud 20d has an inner convex surface 46d rather than an inner cylindrical surface. As shown, in this embodiment sleeve 50c is a specially configured cylindrical member elongated along axis x-x and is generally bounded by rightwardly-facing vertical annular surface 51c, inwardly-facing horizontal cylindrical surface 52c, leftwardly-facing vertical annular surface 53c, and outwardly-facing horizontal cylindrical surface 54c. As shown, in this embodiment both inner and outer surfaces 52c and 54c of sleeve 50d have cylindrical profiles or shapes relative to axis x-x with a uniform outside diameter along their entire axial lengths. As shown, in this embodiment shroud 20d is a specially configured cylindrical member elongated along axis x-x and is generally bounded by rightwardly-facing vertical annular surface 40d, outwardly-facing horizontal cylindrical surface 41d, outwardly-facing frusto-conical surface 42d, outwardly-facing cylindrical surface 43d, which together with leftwardly and outwardly-facing frusto-conical surface 44d and inwardly-facing cylindrical surface 45d, are bent inwardly to form restraining element 49d, inwardly-facing convex surface 46d, leftwardly-facing vertical annular surface 47d, and inwardly-facing horizontal cylindrical surface 48d. As shown, inner surface 46d has a convex longitudinal profile or shape, curving from a maximum inside diameter relative to axis x-x at left annular face 53d and right annular face 51d, respectively, of sleeve 50d, to a minimum inside diameter relative to axis x-x at the axial midpoint between left annular face 53d and right annular face 51d of sleeve 50d.

Turning now to FIG. 13, a security fastener 15e according to a fifth example embodiment is shown. Fastener 15e has many of the features of fastener 15 described above in connection with FIGS. 1-8. The significant difference between fastener 15e and fastener 15 lies in the fact that sleeve 50e of fastener 15e has an outer cylindrical surface 54e rather than an outer convex surface and fastening portion 19e of fastener body 16e has an outer convex surface 25e rather than an outer cylindrical surface. As shown, in this embodiment sleeve 50e is a specially configured cylindrical member elongated along axis x-x and is generally bounded by rightwardly-facing vertical annular surface 51e, inwardly-facing horizontal cylindrical surface 52e, leftwardly-facing vertical annular surface 53e, and outwardly-facing horizontal cylindrical surface 54e. As shown, in this embodiment both inner and outer surfaces 52e and 54e have cylindrical profiles or shapes relative to axis x-x with a uniform outside diameter along their entire axial lengths. As shown, in this embodiment fastening portion 19e of body 16e is generally bounded by rightwardly-facing vertical annular surface 24e, outwardly-facing convex surface 25e, rightwardly-facing annular vertical surface 26e, outwardly-facing horizontal cylindrical surface 27e, and leftwardly and outwardly-facing frusto-conical surface 28e. As shown, outer surface 25e has a convex longitudinal profile or shape relative to axis x-x, curving from a minimum outside diameter relative to axis x-x at left annular face 53e and right annular face 51e, respectively, of sleeve 50e, to a maximum outside diameter at the axial midpoint between left annular face 53c and right annular face 51c of sleeve 50e.

Turning now to FIGS. 14-19, a security fastener 115 according to a seventh example embodiment is shown. Fastener 115 has many of the features of fastener 15 described above in connection with FIGS. 1-8. The significant difference between fastener 115 and fastener 15 lies in the fact that fastener 115 does not include a separate intermediate sleeve 50.

Fastener 115 generally includes fastener body 116 and cap or shroud 20, which rotates about axis x-x relative to fastener body 116. Fastener body 116 includes threaded fastening portion 118, inner tool engaging portion 117, and specially configured outer shroud-retaining portion 119, on which shroud 20 is rotationally and concentrically supported at no more than three annular contact regions.

With reference to FIG. 16, fastener body 116 is a specially configured cylindrical member elongated along axis x-x and is generally bounded by rightwardly-facing vertical annular surface 124, outwardly-facing convex surface 125, leftwardly and outwardly-facing frusto-conical surface 128, outwardly-facing horizontal cylindrical surface 129, leftwardly and outwardly-facing frusto-conical surface 130, leftwardly-facing vertical annular surface 131, inwardly-facing horizontal cylindrical surface 132, leftwardly and inwardly-facing frusto-conical surface 133, inwardly-facing horizontal cylindrical surface 134, rightwardly-facing vertical annular surface 135, and inwardly-facing horizontal key patterned cylindrical surface 136.

Surfaces 131, 132, 133 and 134 generally define threaded fastening portion 118. Threaded fastening portion 118 of fastener body 116 includes cylindrical bore 121, defined by surface 134, that extends inwardly from the left face 131 of body 116 and is internally threaded over a portion or all of its length. Nut fastener 15 may be installed in a wheel hole having an annular recess entrance and a wheel stud or post in the wheel hole, with fastener body 116 and fastening portion 118 1 sized and installed such that the interior threads of inner bore 121 engage the corresponding exterior threads of the wheel stud in the wheel hole.

Surfaces 124, 136 and 135 generally define tool engaging portion 117. Tool engaging portion 117 includes specially configured inner cavity or socket 122, defined by lock patterned surface 136, that extends inwardly from right end face 124 of body 116 and has a specially configured internal profile to which a drive torque may be applied. This internal profile comprises a key-receiving pattern that may be implemented as a set of circumferentially spaced internally facing longitudinally extending key-receiving grooves 123 arranged in a lock pattern to which a drive torque may be applied, Such grooves are configured so that a corresponding drive key tool (no shown) may be used to engage lock pattern grooves 123. Thus, a key having a matching set of key pattern lobes may be used to engage lock pattern grooves 123 to actuate nut fastener 115 about axis x-x.

Shroud-retaining portion 119, on which shroud 20 is rotationally and concentrically supported, is at the same end of body 116 as tool engaging portion 117. Surfaces 124, 125 and 128 generally define shroud-retaining portion 119. As shown, retaining portion 119 of fastener body 116 comprises outwardly-facing convex surface 125 orientated about axis x-x and axially bounded at one end by step 138, defined by annular surface 128, and axially bounded at the other end by a step defined by annular end surface 124. Outer surface 125 has a convex longitudinal profile or shape relative to axis x-x, curving from minimum outside diameter 165 at the left junction with surface 128 and right junction with annular face 124, respectively, to maximum outside diameter 163 at the axial midpoint between such junctions.

Shroud 20 extends over and around retaining portion 119 of fastener body 116. In the pre-assembled state shown in FIG. 16, shroud 20 is a specially configured cylindrical member elongated along axis x-x and is generally bounded by rightwardly-facing vertical annular surface 40, outwardly-facing horizontal cylindrical surface 41, leftwardly and outwardly-facing frusto-conical surface 42, outwardly-facing horizontal cylindrical surface 43, leftwardly and outwardly-facing frusto-conical surface 44, leftwardly-facing vertical annular surface 45, inwardly-facing horizontal cylindrical surface 46, leftwardly-facing vertical annular surface 47, and inwardly-facing horizontal cylindrical surface 48. As shown, shroud 20 includes inner bore 56, defined by surface 47, having uniform inside diameter 64 just slightly larger than the maximum outside diameter 163 of convex surface 125 of fastening portion 119 of body 116.

Figure 17:
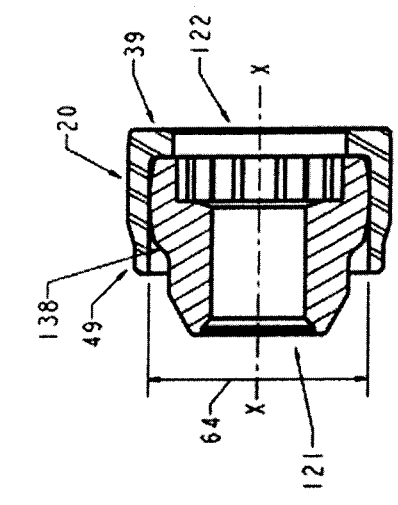
FIG. 17 is a pre-assembled longitudinal vertical sectional view of the security fastener shown in FIG. 14.

In the pre-assembled state shown in FIG. 17, shroud 20 has been placed over left distal end 124 of body 116 such that leftwardly-facing annular end face 47 of shroud 20 abuts against rightwardly-facing annular end face 124 of retaining portion 19 of fastener body 116. As shown, in this pre-assembled state the left thin-walled tubular end 49 of shroud 20 is dimensioned to extend leftwardly a distance beyond step 138 of fastener body 116, defined by the junction of surfaces 125 and 128. When assembled as described below, this extension will be reduced in axial length along axis x-x as end portion 49 of shroud 20 deforms and bends or curls inwardly against the sloped surface 128 of step 138 of retaining portion 119 of fastener body 116.

Figure 18:
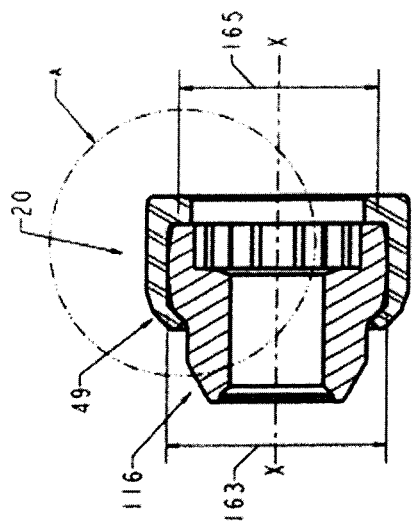
FIG. 18 is a fully-assembled longitudinal vertical sectional view of the security fastener shown in FIG. 14.
Figure 19:
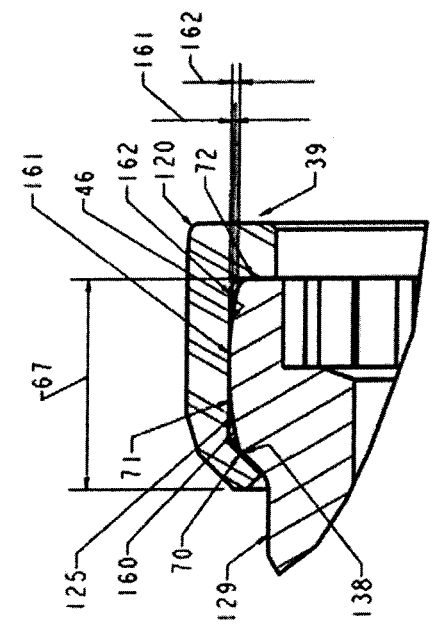
FIG. 19 is an enlarged detailed view of the security fastener shown in FIG. 18, taken generally within the indicated circle A of FIG. 18.

To complete assembly of fastener 115, with shroud 20 placed on fastener body 116 as described above, a rightward and inward axial and radial force is then applied with a ram to surface 44 of end 49 of shroud 20 while right inwardly-extending annular flange 39, defined by surfaces 47, 48 and 40, of shroud 20, and end face 124 of fastener body 116, are held stationary in a press or the like. Such force is great enough to bend and deform annular end rim portion 49 of shroud 20 inward against opposed surface 128 of fastener body 116, as shown in FIGS. 18 and 19, which depict the fully assembled configuration of fastener 115. Thus, fastener body 116 and shroud 20 are specially formed such that applying a directed force to rim 49 of shroud 20 causes annular end rim portion 49 of shroud 20 to flare or deform inwards around specially formed step 138 of retaining portion 119 of fastener body 116.

When assembled, at least deformed portion 49 of shroud 20, which is bent inwardly transverse to central axis x-x, radially overlaps step 138 of retaining portion 119 of fastener body 116, thereby retaining shroud 20 from moving axially to the right relative to fastener body 116 such that shroud 20 is free to rotate about center axis x-x of body 116 but is restrained from moving axially to the right off of retaining portion 119 and body 116. In the other direction, surface 124 of retaining portion 119 of body 116 and opposed surface 47 of shroud 20 retain shroud 20 such that shroud 20 is free to rotate about center axis x-x of body 116 but is restrained from moving axially to the left.

Shroud 20 is thereby mounted concentrically on retaining portion 119 of fastener 115 such that it does not move axially off of surface 125 of retaining portion 119 but is substantially free to rotate about axis x-x relative to fastener body 116.

As shown in FIG. 19, surface 46 of shroud 20 is cylindrical and general configured to align parallel to axis x-x. In contrast, surface 125 of retaining portion 19 of body 16 is convex and spherical relative to axis x-x and surface 46 of shroud 20. It is not parallel. With this arc relationship, over a given overlapping length, the arc radius of surface 125 relative to surface 46 is sized so that there is sufficient clearance around body 116 such that the contact patches between shroud 20 and body 16 are limited to three small annular regions 71, 72 and 73. Due to the non-parallel orientations of opposed surfaces 25 and 46 along an axially overlapping portion 67 of shroud 20 and fastener body 16, shroud 20 is supported in rotatable relationship with body portion 119 so as to define an annular varying radial gap 160 between shroud inner surface 46 and body outer surface 125 along axially overlapping portion 67. As shown, shroud 20 is thereby is supported in rotatable relationship with body portion 19 at no more than three discrete annular contact regions 70, 71 and 72. Contact region 70 is an annular contact region defined by the retaining element of bent rim 49 of shroud 20 against step-down surface 128 of step 138 in body 116. Contact region 72 is an annular contact region defined by the retaining element of flange 39 surface 47 of shroud 20 against step-down annular surface 124 of body 116. Intermediate annular contact region 71 is positioned axially between annular contact region 70 and annular contact region 72, at an axial position at which annular varying radial gap 160 is a minimum 161. As shown in FIG. 19, annular varying radial gap 160 has a cross-sectional area in a plane generally perpendicular to central axis x-x and such cross-section area is not uniform along axially overlapping portion 67, varying from maximum 162 at a first axial position, in this embodiment near step 138 or near end face 124, to minimum 161 at a second axial position.

Figure 20:
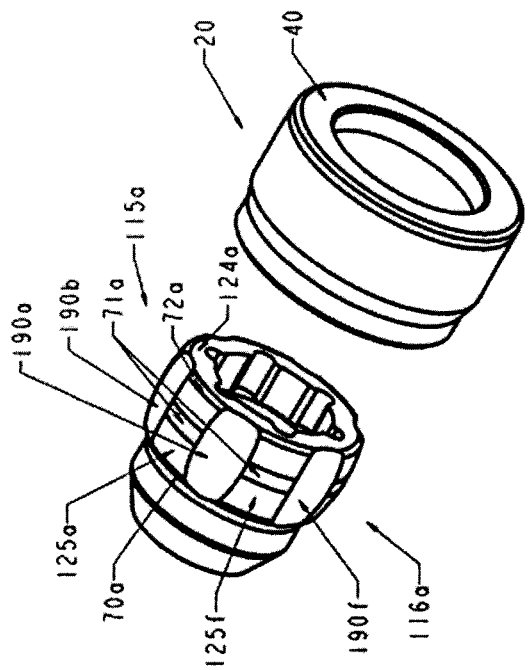
FIG. 20 is a fully-assembled exploded perspective view of an alternative embodiment of the security fastener shown in FIG. 14.
Figure 22:
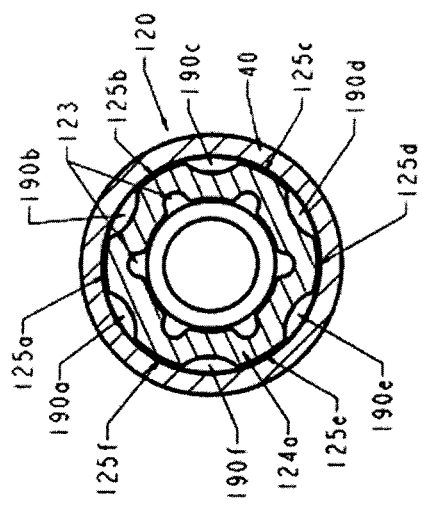
FIG. 22 is a longitudinal vertical sectional view of the security fastener shown in FIG. 20.
Figure 21:
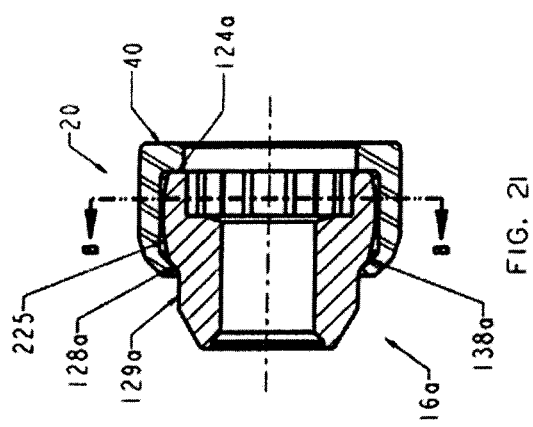
FIG. 21 is a transverse vertical sectional view of the security fastener shown in FIG. 20.

Turning now to FIGS. 20-22, a security fastener 115a according to an eighth example embodiment is shown. Fastener 115a has many of the features of fastener 115 described above in connection with FIGS. 14-19. The significant difference between fastener 115a and fastener 115 lies in the fact that outwardly-facing convex surface 225 of retaining portion 119a includes six longitudinally extending grooves 90a-90f therein equally spaced circumferentially about axis x-x.

As shown, in this embodiment fastening portion 119a of body 116a, on which shroud 20 is rotationally supported, is generally bounded by rightwardly-facing vertical annular surface 124a, outwardly-facing convex surface 225, having outwardly-facing longitudinally convex segments 125a-125f and grooves 190a-190f therebetween, and leftwardly and outwardly-facing frusto-conical surface 128a. As shown, outer surface 225 of retaining portion 119a of fastener body 116a comprises six curvilinear segments 125a-125f equally spaced circumferentially about axis x-x and six grooves 90a-90f extending longitudinally between respective segments 125a-125f. Each of segments 125a-125f comprises an outwardly-facing convex or barrel shaped curvilinear surface orientated about axis x-x and axially bounded at one end by step 138a, defined by annular surface 128s, and axially bounded at the other end by a step defined by annular end surface 124a. Each of outer segment surfaces 125a-125f curves from a minimum outside diameter at the left junction with surface 128a and the right junction with annular face 124a, respectively, to a maximum outside diameter at the axial midpoint between such junctions. Each of grooves 90a-90f extends longitudinally from left surface 128a to right annular face 124a, respectively. Each of grooves 90a-90f has a minimum inward radial depth from respective surfaces 125a-125f at the left junction with surface 128a and the right junction with annular face 124a, respectively, and has a maximum inward radial depth from surfaces 125a-125f, respectively, at the axial midpoint between such junctions.

The components of the embodiments of the fastener may be formed of various different materials. For example, and without limitation, steel, stainless steel, brass, aluminum and titanium may be used. As another alternative, and without limitation, non-metallic materials may be used in some applications. In some applications, and without limitation, the cap or shroud may be of a material harder than the lock body. For example, and without limitation, the spin cap or shroud may have a hardness range from about 36 Rockwell C to 55 Rockwell C and the lock body may have a hardness less than the hardness of the spin cap. The hardness of the spin cap may be less than about 40 Rockwell C.

The present invention contemplates that many changes and modifications may be made. Therefore, while forms of the improved fastener have been shown and described, and a number of alternatives discussed, persons skilled in this art will readily appreciate that various additional changes and modifications may be made without departing from the scope of the invention, as defined and differentiated by the following claims.

What is claimed is:

1. A fastener comprising:
    a fastener body orientated about a central axis;
    said fastener body having a tool-engaging portion to which a driving torque may be applied and a threaded fastening portion configured and arranged to mate with a corresponding threaded element;
    said fastener body having a shroud-receiving body portion orientated about said central axis;
    a shroud concentrically mounted on said shroud-receiving body portion;
    an intermediate sleeve disposed concentrically between said shroud-receiving body portion and said shroud;
    said shroud having an inner surface facing an outer surface of said intermediate sleeve;

said intermediate sleeve having an inner surface facing an outer surface of said shroud-receiving body portion;

said shroud being supported in rotatable relationship with said shroud-receiving body portion such that said shroud will rotate relative to said fastener body under an applied external torque prior to said fastener body rotating when said fastener is engaged with an external structure at a design installation torque;

a first shroud-retaining element restraining said shroud from movement in at least a first axial direction along said central axis relative to said fastener body;

a second shroud-retaining element restraining said shroud from movement in at least a second axial direction along said central axis opposite to said first axial direction along said central axis relative to said fastener body; and said outer surface of said intermediate sleeve having a coefficient of friction less than (i) said outer surface of said shroud-receiving body portion or (ii) said inner surface of said shroud or (iii) both said outer surface of said shroud-receiving body portion and said inner surface of said shroud.

2. The fastener of claim 1, wherein said intermediate sleeve is supported in rotatable relationship with said shroud-receiving body portion and said shroud such that said intermediate sleeve is rotatable about said central axis relative to both said fastener body and said shroud.

3. The fastener of claim 1, comprising a first sleeve-retaining element restraining said intermediate sleeve from movement in at least a first axial direction along said central axis relative to said fastener body and a second sleeve-retaining element restraining said intermediate sleeve from movement in at least a second axial direction along said central axis opposite to said first axial direction along said central axis relative to said fastener body.

4. The fastener of claim 3, wherein:

said first shroud-retaining element comprises a surface of said fastener body and said second shroud-retaining element comprises a surface of said fastener body; and said first sleeve-retaining element comprises a surface of said fastener body and said second sleeve-retaining element comprises a surface of said shroud.

5. The fastener of claim 4, wherein:

said first sleeve-retaining element comprises an annular shoulder of said fastener body facing an opposed annular end of said intermediate sleeve;

said second sleeve-retaining element comprises an annular flange of said shroud facing an opposed annular end of said intermediate sleeve;

said first shroud-retaining element comprises an annular end portion of said shroud bent inwardly transverse to said central axis and facing an opposed annular step of said fastener body; and said second shroud-retaining element comprises said annular flange of said shroud facing an opposed annular end of said fastener body.

6. The fastener set forth in claim 1, wherein said fastener body comprises a lock nut or a lock bolt.

7. The fastener set forth in claim 1, wherein said inner surface of said shroud is not substantially parallel to said outer surface of said intermediate sleeve and said inner surface of said intermediate sleeve is substantially parallel to said outer surface of said shroud-receiving body portion.

8. A fastener comprising:

a fastener body orientated about a central axis;

said fastener body having a tool-engaging portion to which a driving torque may be applied and a threaded fastening portion configured and arranged to mate with a corresponding threaded element;

said fastener body having a shroud-receiving body portion orientated about said central axis;

a shroud concentrically mounted on said shroud-receiving body portion;

an intermediate sleeve disposed concentrically between said shroud-receiving body portion and said shroud;

said shroud having an inner surface facing an outer surface of said intermediate sleeve;

said intermediate sleeve having an inner surface facing an outer surface of said shroud-receiving body portion;

said shroud being supported in rotatable relationship with said shroud-receiving body portion such that said shroud will rotate relative to said fastener body under an applied external torque prior to said fastener body rotating when said fastener is engaged with an external structure at a design installation torque;

a first shroud-retaining element restraining said shroud from movement in at least a first axial direction along said central axis relative to said fastener body;

a second shroud-retaining element restraining said shroud from movement in at least a second axial direction along said central axis opposite to said first axial direction along said central axis relative to said fastener body; and said inner surface of said intermediate sleeve having a coefficient of friction less than said outer surface of said shroud-receiving body portion.

9. The fastener of claim 8, wherein said intermediate sleeve is supported in rotatable relationship with said shroud-receiving body portion and said shroud such that said intermediate sleeve is rotatable about said central axis relative to both said fastener body and said shroud, and comprising a first sleeve-retaining element restraining said intermediate sleeve from movement in at least a first axial direction along said central axis relative to said fastener body and a second sleeve-retaining element restraining said intermediate sleeve from movement in at least a second axial direction along said central axis opposite to said first axial direction along said central axis relative to said fastener body.

10. A fastener comprising:

a fastener body orientated about a central axis;

said fastener body having a tool-engaging portion to which a driving torque may be applied and a threaded fastening portion configured and arranged to mate with a corresponding threaded element;

said fastener body having a shroud-receiving body portion orientated about said central axis;

a shroud concentrically mounted on said shroud-receiving body portion;

an intermediate sleeve disposed concentrically between said shroud-receiving body portion and said shroud;

said shroud having an inner surface facing an outer surface of said intermediate sleeve;

said intermediate sleeve having an inner surface facing an outer surface of said shroud-receiving body portion;

said shroud being supported in rotatable relationship with said shroud-receiving body portion such that said shroud will rotate relative to said fastener body under an applied external torque prior to said fastener body rotating when said fastener is engaged with an external structure at a design installation torque;

a first shroud-retaining element restraining said shroud from movement in at least a first axial direction along said central axis relative to said fastener body;

a second shroud-retaining element restraining said shroud from movement in at least a second axial direction along said central axis opposite to said first axial direction along said central axis relative to said fastener body; and said intermediate sleeve comprising a lubricant-releasing medium or a polymer.

11. The fastener of claim 10, wherein said intermediate sleeve comprises a material selected from a group consisting of a lubricant-impregnated nylon plastic, a lubricant-filled nylon plastic, a polytetrafluoroethylene (PTFE) releasing polymer, a graphite impregnated porous bronze or iron alloy, and a lubricant-impregnated porous bronze or iron alloy.

12. The fastener of claim 10, wherein said intermediate sleeve is supported in rotatable relationship with said shroud-receiving body portion and said shroud such that said intermediate sleeve is rotatable about said central axis relative to both said fastener body and said shroud, and comprising a first sleeve-retaining element restraining said intermediate sleeve from movement in at least a first axial direction along said central axis relative to said fastener body and a second sleeve-retaining element restraining said intermediate sleeve from movement in at least a second axial direction along said central axis opposite to said first axial direction along said central axis relative to said fastener body.

13. A fastener comprising:
a fastener body orientated about a central axis;
said fastener body having a tool-engaging portion to which a driving torque may be applied and a threaded fastening portion configured and arranged to mate with a corresponding threaded element;
said fastener body having a shroud-receiving body portion orientated about said central axis;
a shroud concentrically mounted on said shroud-receiving body portion;
an intermediate sleeve disposed concentrically between said shroud-receiving body portion and said shroud;
said shroud having an inner surface facing an outer surface of said intermediate sleeve;
said intermediate sleeve having an inner surface facing an outer surface of said shroud-receiving body portion;
said shroud being supported in rotatable relationship with said shroud-receiving body portion such that said shroud will rotate relative to said fastener body under an applied external torque prior to said fastener body rotating when said fastener is engaged with an external structure at a design installation torque;
a first shroud-retaining element restraining said shroud from movement in at least a first axial direction along said central axis relative to said fastener body;
a second shroud-retaining element restraining said shroud from movement in at least a second axial direction along said central axis opposite to said first axial direction along said central axis relative to said fastener body; and
wherein a coefficient of friction between said outer surface of said intermediate sleeve and said inner surface of said shroud is less than a coefficient of friction between said outer surface of said shroud-receiving body portion and said inner surface of said shroud.

14. The fastener of claim 13, wherein said intermediate sleeve is supported in rotatable relationship with said shroud-receiving body portion and said shroud such that said intermediate sleeve is rotatable about said central axis relative to both said fastener body and said shroud, and comprising a first sleeve-retaining element restraining said intermediate sleeve from movement in at least a first axial direction along said central axis relative to said fastener body and a second sleeve-retaining element restraining said intermediate sleeve from movement in at least a second axial direction along said central axis opposite to said first axial direction along said central axis relative to said fastener body.

15. A fastener comprising:
a fastener body orientated about a central axis;
said fastener body having a tool-engaging portion to which a driving torque may be applied and a threaded fastening portion configured and arranged to mate with a corresponding threaded element;
said fastener body having a shroud-receiving body portion orientated about said central axis;
a shroud concentrically mounted on said shroud-receiving body portion;
an intermediate sleeve disposed concentrically between said shroud-receiving body portion and said shroud;
said shroud having an inner surface facing an outer surface of said intermediate sleeve along an axially overlapping portion of said shroud and said intermediate sleeve;
said intermediate sleeve having an inner surface facing an outer surface of said shroud-receiving body portion along an axially overlapping portion of said intermediate sleeve and said shroud-receiving body portion;
said shroud being supported in rotatable relationship with said shroud-receiving body portion such that said shroud will rotate relative to said fastener body under an applied external torque prior to said fastener body rotating when said fastener is engaged with an external structure at a design installation torque;
a first shroud-retaining element restraining said shroud from movement in at least a first axial direction along said central axis relative to said fastener body;
a second shroud-retaining element restraining said shroud from movement in at least a second axial direction along said central axis opposite to said first axial direction along said central axis relative to said fastener body; and
wherein (i) said inner surface of said shroud comprises a substantially cylindrical surface along said axially overlapping portion and said outer surface of said intermediate sleeve comprises a substantially convex curved surface along said axially overlapping portion or (ii) said outer surface of said shroud-receiving body portion comprises a substantially cylindrical surface along said axially overlapping portion and said inner surface of said intermediate sleeve comprises a substantially convex curved surface along said axially overlapping portion or (iii) both said inner surface of said shroud comprises a substantially cylindrical surface along said axially overlapping portion and said outer surface of said intermediate sleeve comprises a substantially convex curved surface along said axially overlapping portion and said outer surface of said shroud-receiving body portion comprises a substantially cylindrical surface along said axially overlapping portion and said inner surface of said intermediate sleeve comprises a substantially convex curved surface along said axially overlapping portion.

16. The fastener of claim 15, wherein said intermediate sleeve is supported in rotatable relationship with said shroud-receiving body portion and said shroud such that said intermediate sleeve is rotatable about said central axis relative to both said fastener body and said shroud, and comprising a first sleeve-retaining element restraining said intermediate sleeve from movement in at least a first axial direction along said central axis relative to said fastener body and a second sleeve-retaining element restraining said intermediate sleeve from movement in at least a second axial direction along said central axis opposite to said first axial direction along said central axis relative to said fastener body.

17. A fastener comprising:
a fastener body orientated about a central axis;
said fastener body having a tool-engaging portion to which a driving torque may be applied and a threaded fastening portion configured and arranged to mate with a corresponding threaded element;
said fastener body having a shroud-receiving body portion orientated about said central axis;
a shroud concentrically mounted on said shroud-receiving body portion;
an intermediate sleeve disposed concentrically between said shroud-receiving body portion and said shroud;
said shroud having an inner surface facing an outer surface of said intermediate sleeve along an axially overlapping portion of said shroud and said intermediate sleeve;
said intermediate sleeve having an inner surface facing an outer surface of said shroud-receiving body portion along an axially overlapping portion of said intermediate sleeve and said shroud-receiving body portion;
said shroud being supported in rotatable relationship with said shroud-receiving body portion such that said shroud will rotate relative to said fastener body under an applied external torque prior to said fastener body rotating when said fastener is engaged with an external structure at a design installation torque;
a first shroud-retaining element restraining said shroud from movement in at least a first axial direction along said central axis relative to said fastener body;
a second shroud-retaining element restraining said shroud from movement in at least a second axial direction along said central axis opposite to said first axial direction along said central axis relative to said fastener body; and
wherein (i) said outer surface of said intermediate sleeve comprises a substantially cylindrical surface along said axially overlapping portion and said inner surface of said shroud comprises a substantially convex curved surface along said axially overlapping portion or (ii) said inner surface of said intermediate sleeve comprises a substantially cylindrical surface along said axially overlapping portion and said outer surface of said shroud-receiving body portion comprises a substantially convex curved surface along said axially overlapping portion or (iii) both said outer surface of said intermediate sleeve comprises a substantially cylindrical surface along said axially overlapping portion and said inner surface of said shroud comprises a substantially convex curved surface along said axially overlapping portion and said inner surface of said intermediate sleeve comprises a substantially cylindrical surface along said axially overlapping portion and said outer surface of said shroud-receiving body portion comprises a substantially convex curved surface along said axially overlapping portion.

18. The fastener of claim 17, wherein said intermediate sleeve is supported in rotatable relationship with said shroud-receiving body portion and said shroud such that said intermediate sleeve is rotatable about said central axis relative to both said fastener body and said shroud, and comprising a first sleeve-retaining element restraining said intermediate sleeve from movement in at least a first axial direction along said central axis relative to said fastener body and a second sleeve-retaining element restraining said intermediate sleeve from movement in at least a second axial direction along said central axis opposite to said first axial direction along said central axis relative to said fastener body.

19. A fastener comprising:
a fastener body orientated about a central axis;
said fastener body having a tool-engaging portion to which a driving torque may be applied and a threaded fastening portion configured and arranged to mate with a corresponding threaded element;
said fastener body having a shroud-receiving body portion orientated about said central axis;
a shroud concentrically mounted on said shroud-receiving body portion;
a first shroud-retaining element at a first axial position along said central axis restraining said shroud from movement in at least a first axial direction along said central axis relative to said fastener body;
a second shroud-retaining element at a second axial position along said central axis restraining said shroud from movement in at least a second axial direction along said central axis opposite to said first axial direction along said central axis relative to said fastener body;
said shroud having a shroud inner surface orientated about said central axis facing a body outer surface orientated about said central axis of said shroud-receiving body portion along an axially overlapping portion of said shroud and said fastener body between said first axial position and said second axial position;
said shroud being supported relative to said shroud-receiving body portion so as to define an annular varying radial gap between said shroud inner surface and said body outer surface along said axially overlapping portion;
said shroud being supported in rotatable relationship with said shroud-receiving body portion such that said shroud will rotate relative to said fastener body under an applied external torque prior to said fastener body rotating when said fastener is engaged with an external structure at a design installation torque; and
said shroud inner surface comprising a substantially cylindrical surface along said axially overlapping portion and said body outer surface comprising a convex curved surface along said axially overlapping portion.

20. The fastener set forth in claim 19, wherein said shroud is supported in rotatable relationship with said shroud-receiving body portion at no more than three discrete annular contact regions.

21. The fastener set forth in claim 20, wherein said annular contact regions comprise a first annular contact region defined by said first shroud retaining element, a second annular contact region defined by said second shroud retaining element, and an intermediate annular contact region positioned axially between said first annular contact region and said second annular contact region.

22. The fastener of claim 21, wherein said first shroud-retaining element comprises an annular end portion of said shroud bent inwardly transverse to said central axis and facing an opposed annular step of said fastener body and said second shroud-retaining element comprises an annular flange of said shroud facing an opposed annular end of said fastener body.

23. The fastener set forth in claim 21, wherein said intermediate annular region is between said first annular contact region and said second annular contact region at an axial position at which said annular varying radial gap is a minimum.

24. The fastener set forth in claim 19, wherein said convex curved surface along said axially overlapping portion comprises multiple grooves extending longitudinally therein.

25. The fastener set forth in claim 19, wherein said annular varying radial gap has a cross-sectional area in a plane generally perpendicular to said central axis and said cross-section area is not uniform along said axially overlapping portion.

26. The fastener set forth in claim 25, wherein said cross-section area varies from a minimum cross-sectional area at a first axial position along said axially overlapping portion to a maximum cross-sectional area at a second axial position along said axially overlapping portion.

27. The fastener set forth in claim 19, wherein said fastener body comprises a lock nut or a lock bolt.

* * * * *